(12) United States Patent
Peng et al.

(10) Patent No.: US 8,247,776 B2
(45) Date of Patent: Aug. 21, 2012

(54) DEVICE AND METHOD FOR DETECTING ORIENTATION OF RADIOACTIVE MATERIAL

(75) Inventors: Hua Peng, Beijing (CN); Kun Zhao, Beijing (CN); Yu He, Beijing (CN); Ming Ruan, Beijing (CN)

(73) Assignee: Nuctech Company Limited, Beijing (CN)

( * ) Notice: Subject to any disclaimer, the term of this patent is extended or adjusted under 35 U.S.C. 154(b) by 629 days.

(21) Appl. No.: 12/341,219

(22) Filed: Dec. 22, 2008

(65) Prior Publication Data
US 2009/0166540 A1 Jul. 2, 2009

(30) Foreign Application Priority Data
Dec. 29, 2007 (CN) .......................... 2007 1 0308543

(51) Int. Cl.
*G01T 1/169* (2006.01)
(52) U.S. Cl. .................................... 250/361 R; 250/362
(58) Field of Classification Search ... 250/361 R–363.1, 250/370.09, 370.01, 370.05, 390.01–391
See application file for complete search history.

(56) References Cited

U.S. PATENT DOCUMENTS

| | | | |
|---|---|---|---|
| 4,277,680 A * | 7/1981 | Rodriguez et al. | 250/358.1 |
| 5,059,799 A * | 10/1991 | Kurakake | 250/363.1 |
| 5,659,177 A * | 8/1997 | Schulte et al. | 250/390.12 |
| 6,700,949 B2 * | 3/2004 | Susami et al. | 378/19 |
| 2003/0012324 A1 * | 1/2003 | Haruyama | 376/159 |
| 2004/0164250 A1 * | 8/2004 | Cork et al. | 250/390.06 |
| 2005/0023479 A1 * | 2/2005 | Grodzins | 250/390.11 |
| 2006/0255254 A1 | 11/2006 | Twomey | 250/252.1 |
| 2009/0230315 A1 * | 9/2009 | Hunter et al. | 250/390.01 |

* cited by examiner

*Primary Examiner* — David Porta
*Assistant Examiner* — Casey Bryant
(74) *Attorney, Agent, or Firm* — Westman, Champlin & Kelly, P.A.

(57) ABSTRACT

Disclosed is a device for detecting orientation of a radioactive material to determine presence and position of the radioactive material, comprising: at least one first radiation detector; at least one second radiation detector, each of said at least one second radiation detector and each of said at least one first radiation detector being arranged side by side and in pairs, detection surfaces of said first and second radiation detector being in the same plane to receive radiation from the same direction in the same manner and to generate a first detection signal and a second detection signal, respectively; a shielding plate, said shielding plate being arranged between said first radiation detector and said second radiation detector arranged in a pair and extending forward beyond said detection surfaces; and a determination device for receiving the first and second detection signals from said first and second radiation detector, and determining whether a radioactive material exists or not according to said first and second detection signals and simultaneously determining the orientation of the radioactive material according to the difference between said first detection signal and said second detection signal. Also disclosed is a method for detecting orientation of a radioactive material.

13 Claims, 3 Drawing Sheets

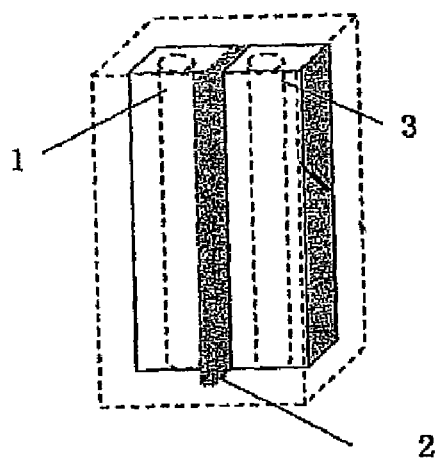
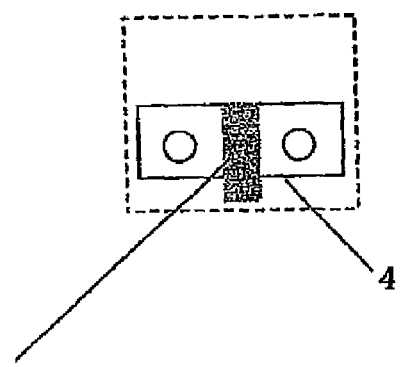
FIG. 4
FIG. 5
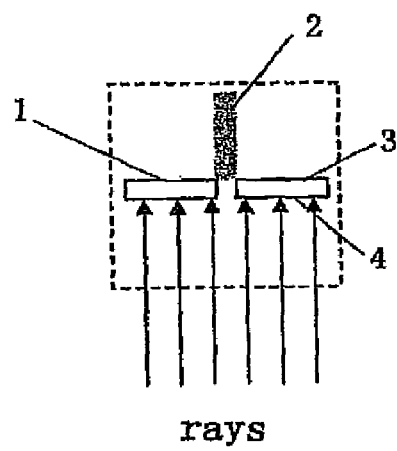
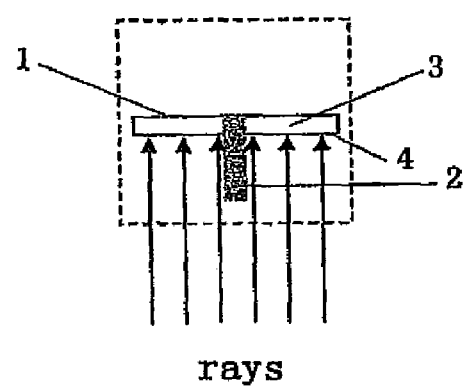
FIG. 6a
FIG. 6b
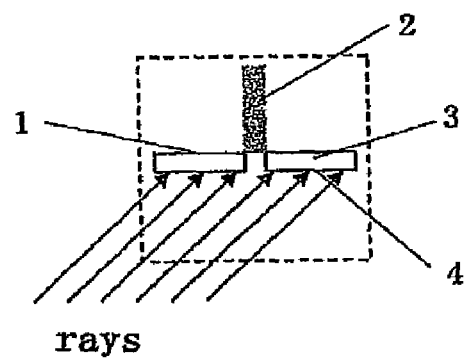
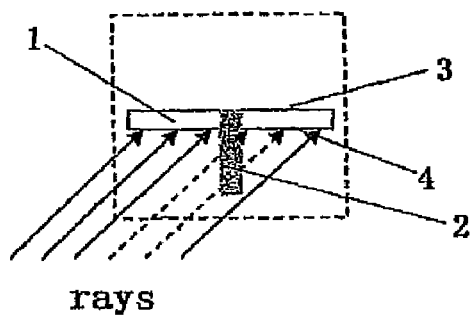
FIG. 6c
FIG. 6d

DEVICE AND METHOD FOR DETECTING ORIENTATION OF RADIOACTIVE MATERIAL

The present application claims priority of Chinese patent application Serial No. 200710308543.X, filed Dec. 29, 2007, the content of which is hereby incorporated by reference in its entirety.

FIELD OF THE INVENTION

The present invention relates to an device and a method for detecting orientation of a radioactive material and, in particular, to a hand-held radiation detection device and a detecting method which not only can detect presence of a radiation source, but also can provide information about orientation of the source, so that position of an unknown radiation source can be quickly determined. The hand-held radiation detection device and the detecting method of this invention can be applied to any site where orientation of a radioactive material is required to be detected, such as a customs port, a nuclear physics lab, a nuclear power plant, a burial site or a warehouse for nuclear waste, a hospital, a weapon factory, and so on.

DESCRIPTION OF THE RELATED ART

Conventional portable or hand-held radiation detection device employs a plastic scintillator detector or a $^3$He neutron tube detector to detect gamma rays emitted from radioactive material (i.e., a radiation source), and generate an alarm when presence of the radioactive material is detected. A defect of such conventional radiation detection devices is that they only can provide information about radiation intensity where there is radioactive material, but can not determine the position of the radioactive material. Thus, it is very difficult to rapidly determine the orientation of a radioactive material by using the conventional radiation detection device.

SUMMARY OF THE INVENTION

In order to overcome the above-mentioned defect existing in the conventional technique, the present invention provides a device for detecting orientation of a radioactive material which not only can detect presence of the radioactive material, but also can detect position of the radioactive material. The present invention also provides a method for detecting the position of a radioactive material.

According to one aspect of the present invention, an device for detecting orientation of a radioactive material is provided to determine presence and position of the radioactive material, comprising at least one first radiation detector; at least one second radiation detector, each of said at least one second radiation detector and each of said at least one first radiation detector being arranged side by side and in pairs, detection surfaces of said first and second radiation detector being in the same plane to receive rays from the same direction in the same manner and to generate a first detection signal and a second detection signal, respectively; a shielding plate arranged between said first radiation detector and said second radiation detector arranged in pairs and extending forward beyond said detection surfaces; and a determination device configured to receive the first and second detection signals from said first and second radiation detector, and determining whether a radioactive material exists or not based on said first and second detection signals and simultaneously determining the orientation of the radioactive material according to the difference between said first detection signal and said second detection signal.

The device for detecting the orientation of the radioactive material further comprises a first frame and a second frame arranged side by side, said first radiation detector and said second radiation detector being arranged within said first frame and said second frame, respectively.

In the device for detecting the orientation of the radioactive material, a sliding rail mechanism is arranged between said first frame and said second frame, and wherein said shielding plate is slidable within said sliding rail mechanism to allow said shielding plate to extend toward beyond said detection surfaces or retreat backward behind said detection surfaces.

In the device for detecting the orientation of the radioactive material, said shielding plate is provided with a gripping portion.

In the device for detecting the orientation of the radioactive material, said first and second radiation detector are plastic scintillator detectors.

In the device for detecting the orientation of the radioactive material, the portions of said plastic scintillator detectors except the detection surfaces are enclosed by shielding material. In the device for detecting the orientation of the radioactive material, said first and second radiation detector are $^3$He neutron tube detectors.

In the device for detecting the orientation of the radioactive material, the detection surfaces of said $^3$He neutron tube detector are provided with a moderating layer made of polyethylene material and having a thickness of about 3 cm.

In the device for detecting the orientation of the radioactive material, the portions of said $^3$He neutron tube detector except the detection surfaces are provided with a shielding layer made of polyethylene material and having a thickness of about 5-8 cm.

According to another aspect of this invention, a method for detecting orientation of a radioactive material to determining presence and position of the radioactive material is provided, comprising steps of providing a first radiation detector and a second radiation detector side by side and in pairs, and arranging detection surfaces of said first and second radiation detector to be in the same plane so as to receive rays from the same direction in the same manner and to generate first and second detection signals, respectively; providing a shielding plate between said first and second radiation detector arranged in pairs, the shielding plate vertically extending forward beyond said detection surfaces; and determining whether a radioactive material exists or not based on said first and second detection signals, and determining the orientation of the radioactive material according to the difference between the first and second detection signals.

BRIEF DESCRIPTION OF THE DRAWINGS

Hereafter, the present invention is explained in details by taking an embodiment as an example in conjunction with the drawings, in which:

FIG. 4 is a schematic view of the first embodiment of the device for detecting the orientation of the radioactive material according to this invention;

FIG. 5 is a top view of FIG. 4;

FIGS. 6a-6d are operation diagrams of the device for detecting the orientation of the radioactive material according to this invention.

DETAILED DESCRIPTION OF THE PREFERRED EMBODIMENT

Reference is made to the illustrative and non-limited embodiment of the present invention in details to explain the device for detecting orientation of a radioactive material according to the present invention.

Figure 1:
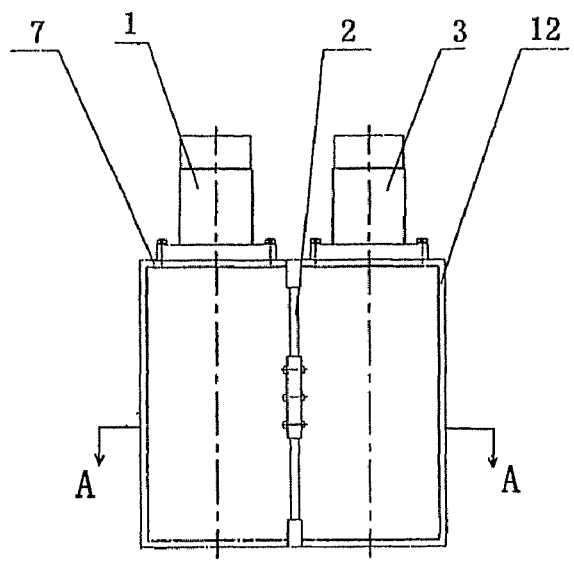
FIG. 1 is a schematic view of a structure of the first embodiment of the device for detecting the orientation of the radioactive material according this invention.
Figure 2:
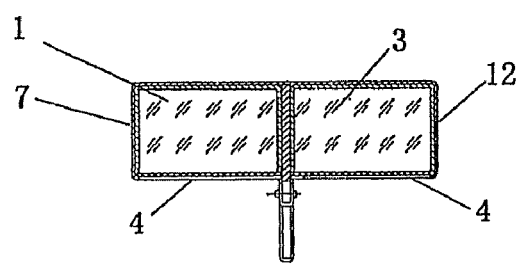
FIG. 2 is a cross-section view taken along A-A line in FIG. 1.
Figure 3:
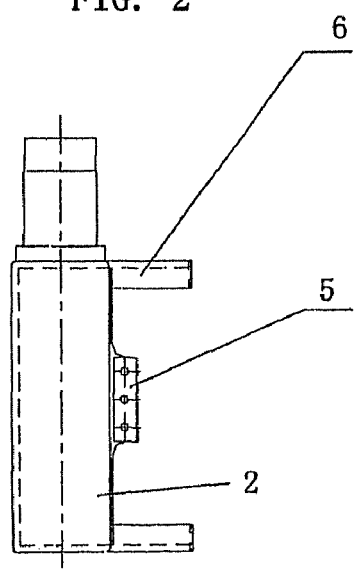
FIG. 3 is a side view of FIG. 1.

Referring to FIGS. 1-3, the device for detecting the orientation of the radioactive material according to the present invention is provided to detect whether a radioactive material exists or not and to determine the position of the radioactive material in a site where the radioactive material (i.e., a radiation source) is suspected to be present. The orientation detecting device for detecting the orientation of the radioactive material comprises a first radiation detector 1 and a second radiation detector 3 which is identical with the first radiation detector 1 in type and parameter. The first and second radiation detector 1 and 3 may be, for example, X-ray detectors or γ-ray detectors. In the first embodiment of the present invention, a plastic scintillator detector for detecting gamma rays is taken as an example to explain the device for detecting the orientation of the radioactive material according to this invention. The first and second radiation detector 1 and 3 are provided side by side and are in a pair. Detection surfaces 4 of the first and second radiation detector 1 and 3 (i.e., the surfaces where the rays to be detected enter the radiation detector) are in the same plane to allow the first radiation detector 1 and the second radiation detector 3 to receive gamma rays from the same direction in the same manner and to generate a first detection signal and a second detection signal, respectively. Ray receiving operation and electrical-signal generating operation of each of the first radiation detector 1 and the second radiation detector 3 may be same as those of a conventional single radiation detector, such as a plastic scintillator detector and like. The generated electrical signal can indicate whether a radiation source exists in the vicinity of the plastic scintillator detector or not and also can indicate the intensity of the detected rays. It can be understood for skilled in the art that the numbers of the first and second radiation detector may be 1, respectively, i.e., a pair of radiation detectors is provided. Two or three first and second radiation detectors also can be used, i.e., two pairs or three pairs of radiation detectors.

It should be noted that the first and second detection signals, in the practical use, are sums of a reference signal and net detection signals, respectively. Generally, the reference signal is not zero.

Figure 7:
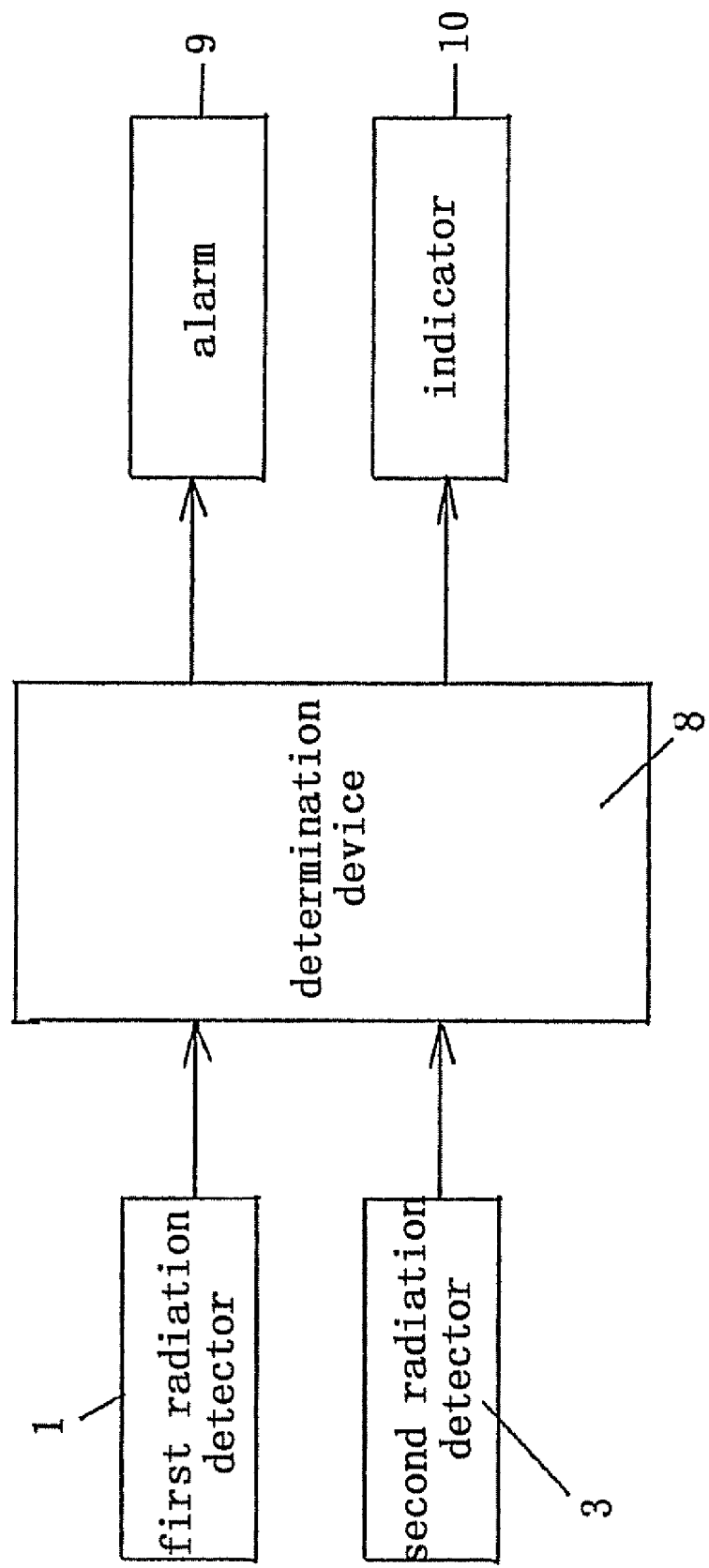
FIG. 7 is a circuit diagram of the device for detecting the orientation of the radioactive material according to this invention.

The device for detecting the orientation of the radioactive material according to this invention further comprises a shielding plate 2, such as a lead plate, for shielding gamma rays. The shielding plate 2 is provided between the first radiation detector 1 and the second radiation detector 3 which are in a pair, and vertically extends toward frontage of the detection surfaces 4 (under the detection surfaces in FIG. 2). The device for detecting the orientation detecting orientation of the radioactive material according to this invention further comprises a determination device 8 (referring to FIG. 7) to receive the first detection signal and the second detection signal from the first radiation detector 1 and the second radiation detector 3, respectively, and to determine whether the radioactive material exists or not from the first and second detection signals. For example, if at least one of the net detection signals of the first detection signal and the second detection signal is not zero, the presence of the radioactive material is determined, and the position of the radioactive material also is determined according to difference between the first detection signal and the second detection signal. The determination device 8 can be connected to an acoustic or visual alarm 9 and/or an indicator 10. The alarm 9 generates an alarm signal when the presence of the radioactive material is determined by the determination device 8. The indicator 10 indicates the radioactive material is located right ahead of the shielding plate 2 or at a front side of the shielding plate 2, for example, including the right side, left side, upper side or lower side away in front of the shielding plate 2, from a further determination result of the determination device 8, so that an operator is guided to determine the specific position of the radioactive material.

In a further exemplary embodiment of this invention, the device for detecting the orientation of the radioactive material further comprises a first frame 7 and a second frame 12 provided side by side. The first radiation detector 1 and the second radiation detector 3 are provided in the first frame 7 and the second frame 12, respectively, and are fixed using fixture parts, such as bolts. A sliding rail mechanism 6 is provided between the first frame 7 and the second frame 12. The sliding rail mechanism 6 may be sliding grooves or sliding protrusions. Accordingly, the opposite sides of the shielding plate 2 are provided with sliding protrusions or sliding grooves, so that the shielding plate 2 can be slid in the sliding rail mechanism 6 to allow the shielding plate 2 to extend forward beyond the detection surfaces 4 or to retreat backward behind the detection surfaces 4 (upper portion of the detection surfaces in FIG. 2). In an embodiment, the shielding plate 2 is provided with a gripping portion 5. The operator can grip the gripping portion 5 to pull/push the shielding plate 2 to extend forward beyond/retreat backward behind the detection surfaces 4.

In the embodiment shown in FIGS. 2 and 3, the sliding rail mechanism 6 can extend forward beyond the detection surfaces 4, but this invention is not limited thereto. Instead of beyond the detection surfaces 4, the sliding rail mechanism 6 can extend only to be flush with the detection surfaces 4 as long as a part of the shielding plate 2 is ensured to be fitted with the sliding rail mechanism 6 when the shielding plate 2 is pulled forward beyond the detection surfaces 4. One skilled in the art can be understood that a fitting structure for filling the shielding plate 2 with the sliding rail mechanism 6 may be in a form of a drawer or a pull-push type keyboard supporting frame.

In an exemplary embodiment, the portion of the plastic scintillator detector except the detection surfaces 4 is enclosed by shielding material, such as a lead plate, so that the rays enter the first or second radiation detector only from the detection surfaces 4, which provides a guiding function at a certain extent.

In the second embodiment of this invention, as shown in FIGS. 4 and 5, both of the first radiation detector 1 and the second radiation detector 3 are $^3$He neutron tube detectors for detecting slow neutrons. In this case, the detection surface of the $^3$He neutron tube detector is provided with a moderating block made of polyethylene material and having a thickness of 3 cm. The neutrons are slowed down when the neutrons collide with the moderating layer. The portions of the plastic scintillator detector except the detection surfaces being enclosed by the shielding layer made of polyethylene material with a thickness of 5-8 cm can prevent the neutrons from entering into the $^3$He neutron tube from these portions. In this way, the neutrons can be detected by the neutron tube only after being slowed through the detection surfaces, which also provides a guiding function at a certain extent.

Next, an operation of detecting, in a site where a radioactive material is suspected to be present, whether a radioactive material exists or not and determining the position of the radioactive material using the device for detecting the orientation of the radioactive material according to this invention is explained in conjunction with FIGS. 6a-6d.

When the orientation detecting device for detecting the orientation of the radioactive material is not operated, the shielding plate 2 is pushed behind the detection surfaces 4 along the guiding rail mechanism 6, so that the size of the whole device can be reduced and thus can be easily transported.

In a case of only requiring to detect whether a radioactive material exists or not, i.e., in an existing mode, the shielding plate 2 is pushed behind the detection surfaces 4 along the sliding rail mechanism 6, as shown in FIGS. 6a and 6b. In this way, the rays from the radioactive material are vertically or aslant incident on the detection surfaces 4 at the same angle without any obstruction. Since the first and second radiation detector 1 and 3 are identical with each other in type and parameters, the resultant first and second detection signals are identical with each other. For example, when both of the first and second detection signals are not zero, it is determined that there exists a radioactive material nearby, and furthermore, the alarm 9 is driven to generate an acoustic alarming signal or a visual alarming signal. It can be understood that the indicator 10 can be turned off in this mode.

In a case where not only the presence of the radioactive material is required to be detected, but also the position of the radioactive material is required to be detected, i.e., in an existing and positioning mode, the shielding plate 2 is pulled forward beyond the detection surfaces 4 along the sliding rail mechanism 6, as shown in FIGS. 6c and 6d. In this way, the rays from the radioactive material enter the first and second radiation detector 1 and 3 at the same angle. If the radioactive material is located right ahead of the orientation detecting device, the rays emitted from the radioactive material are vertically incident on the detection surfaces 4 of the first and second radiation detectors 3 and 4, as shown in FIG. 6c. At this point, the resultant first and second detection signals are identical with each other. The net detection signals of the first and second detection signals are not zero, but difference between the first and second detection signals is zero. According to this principle, when the net detection signals in the first detection signal and the second detection signal are not zero, and the difference between the first and second detection signals is zero, it is determined that there exists a radioactive material nearby and that the radioactive material is located right ahead of the whole orientation detection device. Further, the alarm 9 is driven to generate an acoustic alarming signal or a visual alarming signal, and the indicator 10 generates an orientation signal. If the operator carrying the orientation detecting device follows the orientation signal to move, the specific position of the radioactive material will be determined. When the net detection signals in the first and second detection signals are zero, it is determined that there is no radioactive material.

Still in the existing and positioning mode, if the radioactive material is located at a front side of the shielding plate 2, for example, located at a side where the first radiation detector 1 is mounted, the gamma rays emitted from the radioactive material will obliquely project toward the whole detection surfaces 4 of the first radiation detector 1. However, at least a part of the gamma rays can not arrive on the detection surfaces 4 of the second radiation detector 3 due to obstruction of the shielding plate 2. That is to say, the amount of the rays incident on the first radiation, detector 1 is different from that incident on the second radiation detector 3, and therefore the resultant first detection signal is different from the resultant second detection signal. According to this principle, when the net detection signals in the first and second detection signals are zero, it is determined that there is no radioactive material. When at least one of the net detection signals of the first and second detection signals is not zero, it is determined that there exists a radioactive material nearby. Further, when the difference between the first and second detection signals is, for example, a positive value, it is determined that the radioactive material is located at the side, for example, the right front side, where the first radiation detector 1 is mounted. When the difference between the first and second detection signals is, for example, negative, it is determined that the radioactive material is located at one side, for example, on the left front side, where the second radiation detector 3 is mounted. The alarm 9 is driven to generate an acoustic or visual alarming signal, and the indicator 10 generates an orientation signal. At this time, the detection angle of the whole orientation detecting device is adjusted depending on the alarming signal from the alarm 9 and the orientation signal from the indicator 10 until the indicator 10 indicates that the radioactive material is located right in front of the orientation detecting device. Then, the operator can follow the orientation signal to move on, and the specific position of the radioactive material is finally determined.

It can be understood that the whole orientation detecting device, during detection, can be rotated in the plane where the detection surfaces 4 are located so as to determine that the radioactive material is located at the left, right, upper, or lower side of the shielding plate 2, i.e., to determine the orientation of the radioactive material along the transverse and longitudinal directions, thereby improving efficiency of searching the radioactive material and reducing the operator's stay in the radiation field.

Based on the orientation detecting device for detecting the orientation of the radioactive material according to this invention, this invention also provides a method for detecting an orientation of a radioactive material to detect, in a site where a radioactive material (i.e., a radioactive source) is suspected to be present, whether a radioactive material exists or not and to determine the position of the radioactive material. The method comprises a step of providing the first radiation detector 1 and the second radiation detector 3, which are identical with each other in type and parameters, side by side and in a pair, and arranging the detection surfaces 4 of the first and second radiation detector (i.e., the planes where the gamma rays to be detected enter the radiation detector) to be in the same plane so as to allow the first and second radiation detector 1 and 3 to receive the rays from the same direction in the same manner and to generate the first and second detection signals, respectively. The method further comprises a step of providing the shielding plate 2 between the first and second radiation detector 1 and 3. The shielding plate 2 vertically extends forward beyond the detection surfaces 4, and prevents the rays to be detected from passing through. The method further comprises a step of determining whether a radioactive material exists or not based on the first and second detection signals. If, for example, at least one of the net detection signals of the first and second detection signals is not zero, it is determined that there exists a radioactive material, and also the orientation of the radioactive material is determined according to the difference between the first and second detection signals. Furthermore, when presence of the radioactive material is determined, an acoustic or visual alarming signal is generated, and an orientation signal that indicates the orientation of the detected radioactive material is also generated.

In a further embodiment of the method for detecting an orientation of a radioactive material of this invention, the shielding plate 2 can be extended forward beyond the detection surfaces 4 or be retreated backward behind the detection surfaces 4. Both of the first and second radiation detectors 1 and 3 are scintillator detectors or $^3$He neutron tube detectors. In the above exemplary embodiment, it is described that the first radiation detector 1 and the second radiation detector 3 are identical with each other in type, and when at least one of the net detection signals generated from the first and second radiation detector 1 and 3 is not zero, it means there exists a radioactive material, and when the difference between the detection signals is not zero, it means the radioactive material is located at a side of the shielding plate. However, this invention is not limited to this. It can be understood that the first radiation detector 1 and the second radiation detector 3 may be different from each other in type, If there is a certain relationship between incident rays and signals of each radiation detector, it can be set that at least one of the net detection signals of the first and second detection signals from the first and second radiation detector 1 and 3 to be a certain value means there exists a radioactive material, and the difference between the net detection signals being another certain value means the radioactive material is located at a front side of the shielding plate.

Further, the orientation detecting device according to this invention can be arranged to detect the dose of the detected rays, i.e., to detect tile radiation strength of the radioactive material. With the orientation detecting device according to this invention, detection of a radioactive material can be implemented with a largest detector area to improve detection efficiency and to avoid omission of a radioactive material having a low activity.

Although exemplary embodiments of the present invention have been described, it will be appreciated by those skilled in the art that changes may be made in forms and details without departing from the spirit and scope of the present invention, the scope of which is defined in the appended claims and their equivalents.

What is claimed is:

1. A device for detecting orientation of a radioactive material to determine presence and position of the radioactive material, comprising:
    at least one first radiation detector;
    at least one second radiation detector, each of said at least one second radiation detector and each of said at least one first radiation detector being arranged side by side and in pairs, detection surfaces, which are surfaces where the rays to be detected enter the radiation detector, of said first and second radiation detector being in the same plane to receive rays from the same direction in the same manner and to generate a first detection signal and a second detection signal, respectively, and portions of said first and second radiation detectors except the detection surfaces being enclosed by shielding material, so that the rays enter the first or second radiation detectors only from the detection surfaces;
    a shielding plate arranged between said first radiation detector and said second radiation detector arranged in pairs and extending forward beyond said detection surfaces; and
    a determination device configured to receive the first and second detection signals from said first and second radiation detector, and determine whether a radioactive material exists or not from said first and second detection signals and simultaneously determine the orientation of the radioactive material according to the difference between said first detection signal and said second detection signal;
    wherein when the difference between the first and second detection signals is a positive value, it is determined that the radioactive material is located at the side where the first radiation detector is mounted, and when the difference between the first and second detection signals is a negative value, it is determined that the radioactive material is located at the other side where the second radiation detector is mounted.

2. The device for detecting the orientation of the radioactive material according to claim 1, further comprising a first frame and a second frame arranged side by side, said first radiation detector and said second radiation detector being arranged within said first frame and said second frame, respectively.

3. The device for detecting the orientation of the radioactive material according to claim 2, wherein a sliding rail mechanism is arranged between said first frame and said second frame, and wherein said shielding plate is slidable within said sliding rail mechanism to allow said shielding plate to extend toward beyond said detection surfaces or retreat backward behind said detection surfaces.

4. The device for detecting the orientation of the radioactive material according to claim 1, wherein said shielding plate is provided with a gripping portion.

5. The device for detecting the orientation of the radioactive material according to claim 1, wherein said first and second radiation detector are plastic scintillator detectors.

6. The radiation detection device according to claim 5, wherein the portions of said plastic scintillator detectors except the detection surfaces are enclosed by shielding material.

7. The device for detecting the orientation of the radioactive material according to claim 1, wherein said first and second radiation detector are $^3$He neutron tube detectors.

8. The device for detecting the orientation of the radioactive material according to claim 7, wherein the detection surfaces of said $^3$He neutron tube detector are provided with a moderating layer made of polyethylene material and having a thickness of about 3 cm.

9. The device for detecting the orientation of the radioactive material according to claim 8, wherein the portions of said $^3$He neutron tube detectors except the detection surfaces are provided with a shielding layer made of polyethylene material and having a thickness of about 5-8 cm.

10. A method for detecting orientation of a radioactive material to determine presence and position of the radioactive material, comprising steps of:
    providing a first radiation detector and a second radiation detector side by side and in pairs, and arranging detection surfaces, which are surfaces where the rays to be detected enter the radiation detector, of said first and second radiation detector to be in the same plane so as to receive rays from the same direction in the same manner and to generate first and second detection signals, respectively, wherein portions of said first and second radiation detectors except the detection surfaces are enclosed by shielding material, so that the rays enter the first or second radiation detectors only from the detection surfaces;

providing a shielding plate between said first and second radiation detector arranged in pairs, the shielding plate vertically extending forward beyond said detection surfaces; and determining whether a radioactive material exists or not from said first and second detection signals, and determining the orientation of the radioactive material according to the difference between the first and second detection signals;

wherein when the difference between the first and second detection signals is a positive value, it is determined that the radioactive material is located at the side where the first radiation detector is mounted, and when the difference between the first and second detection signals is a negative value, it is determined that the radioactive material is located at the other side where the second radiation detector is mounted.

11. The method for detecting the orientation of the radioactive material according to claim 10, wherein said shielding plate extends toward beyond said detection surfaces or retreats backward behind said detection surfaces.

12. The method for detecting the orientation of the radioactive material according to claim 10, wherein said first and second radiation detector are plastic scintillator detectors.

13. The method for detecting the orientation of the radioactive material according to claim 10, wherein said first and second radiation detector are $^3$He neutron tube detectors.

* * * * *